US008650119B2

(12) United States Patent
Hahn-Carlson et al.

(10) Patent No.: US 8,650,119 B2
(45) Date of Patent: Feb. 11, 2014

(54) ORDER-RESOURCE FULFILLMENT AND MANAGEMENT SYSTEM AND APPROACH

(75) Inventors: Dean W. Hahn-Carlson, Lilydale, MN (US); David A. Suits, Robbinsdale, MN (US); Raghunandan N. Kanathur, Blaine, MN (US)

(73) Assignee: Syncada LLC, Minneapolis, MN (US)

( * ) Notice: Subject to any disclaimer, the term of this patent is extended or adjusted under 35 U.S.C. 154(b) by 211 days.

(21) Appl. No.: 12/749,322

(22) Filed: Mar. 29, 2010

(65) Prior Publication Data

US 2010/0185540 A1    Jul. 22, 2010

Related U.S. Application Data (63) Continuation of application No. 11/151,748, filed on Jun. 9, 2005, now Pat. No. 7,693,791.

(60) Provisional application No. 60/578,689, filed on Jun. 9, 2004.

(51) Int. Cl.
*G06Q 40/00*         (2012.01)

(52) U.S. Cl.
USPC ........................................... 705/40

(58) Field of Classification Search
USPC ............ 705/26, 29, 39, 40, 44; 707/705–707, 707/713, 790, 793; 725/1
See application file for complete search history.

(56) References Cited

U.S. PATENT DOCUMENTS

| | | |
|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |

(Continued)

FOREIGN PATENT DOCUMENTS

| | | |
|---|---|---|
| EP | 0339850 A2 | 2/1989 |
| EP | 0407026 A2 | 1/1991 |

(Continued)

OTHER PUBLICATIONS

"Buying Products over the Net." South China Morning Post, Hong Kong, Jul. 23, 2000.

(Continued)

*Primary Examiner* — Mary Cheung
(74) *Attorney, Agent, or Firm* — Shumaker & Sieffert, P.A.

(57) ABSTRACT

Historical data is used to manage and authorize payment for merchant offerings for transactions among a plurality of transaction parties. According to an example embodiment of the present invention, invoiced item quantities are processed using historical fulfilled and billed quantities of each item. If invoiced item quantities involved items that have been fulfilled but not billed, payment for the invoiced items is authorized. If some or all of the invoiced items have not been fulfilled or have been previously billed, payment authorization is withheld for at least the portion of unfulfilled or previously billed (and paid) invoiced items. With this approach, historical information relative to order fulfillment and payment status is used to automatically process invoices (e.g., audit the invoices for payment).

23 Claims, 5 Drawing Sheets

(56) References Cited

U.S. PATENT DOCUMENTS

| | | |
|---|---|---|
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke et al. |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lindsey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,685 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | Debusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A | 12/2000 | Webber, Jr. |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 | 7/2001 | Shkedy |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,289 B1 | 4/2002 | Johns |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 | 1/2003 | Maners |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Graef et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |

(56) References Cited

U.S. PATENT DOCUMENTS

| | | | |
|---|---|---|---|
| 6,697,702 | B1 | 2/2004 | Hahn-Carlson |
| 6,704,612 | B1 | 3/2004 | Hahn-Carlson |
| 6,721,613 | B1 | 4/2004 | Yamamoto et al. |
| 6,721,715 | B2 | 4/2004 | Nemzow |
| 6,741,968 | B2 | 5/2004 | Jacoves et al. |
| 6,751,630 | B1 | 6/2004 | Franks et al. |
| 6,785,661 | B1 | 8/2004 | Mandler et al. |
| 6,789,252 | B1 | 9/2004 | Burke et al. |
| 6,792,459 | B2 | 9/2004 | Elnozahy et al. |
| 6,820,038 | B1 | 11/2004 | Wetzer et al. |
| 6,829,590 | B1 | 12/2004 | Greener et al. |
| 6,832,212 | B1 | 12/2004 | Zenner et al. |
| 6,833,865 | B1 | 12/2004 | Fuller et al. |
| 6,850,900 | B1 | 2/2005 | Hare et al. |
| 6,873,963 | B1 | 3/2005 | Westbury et al. |
| 6,873,997 | B1 | 3/2005 | Majjasie et al. |
| 6,879,962 | B1 | 4/2005 | Smith et al. |
| 6,882,983 | B2 | 4/2005 | Furphy et al. |
| 6,882,986 | B1 | 4/2005 | Heinemann et al. |
| 6,889,194 | B1 | 5/2005 | Kadaba |
| 6,895,438 | B1 | 5/2005 | Ulrich |
| 6,915,268 | B2 | 7/2005 | Riggs et al. |
| 6,937,992 | B1 | 8/2005 | Benda et al. |
| 6,941,281 | B1 | 9/2005 | Johnson |
| 6,944,595 | B1 | 9/2005 | Graser et al. |
| 6,973,258 | B1 | 12/2005 | Yoo et al. |
| 6,983,278 | B1 | 1/2006 | Yu et al. |
| 6,988,111 | B2 | 1/2006 | Chow et al. |
| 6,999,943 | B1 | 2/2006 | Johnson et al. |
| 7,047,210 | B1 | 5/2006 | Srinivasan |
| 7,054,841 | B1 | 5/2006 | Tenorio |
| 7,069,234 | B1 | 6/2006 | Cornelius et al. |
| 7,069,248 | B2 | 6/2006 | Huber |
| 7,076,652 | B2 | 7/2006 | Ginter et al. |
| 7,079,176 | B1 | 7/2006 | Freeman et al. |
| 7,099,304 | B2 | 8/2006 | Liu et al. |
| 7,110,959 | B2 | 9/2006 | Hahn-Carlson |
| 7,110,979 | B2 | 9/2006 | Tree |
| 7,113,964 | B1 | 9/2006 | Bequet et al. |
| 7,117,170 | B1 | 10/2006 | Bennett et al. |
| 7,120,871 | B1 | 10/2006 | Harrington |
| 7,124,150 | B2 | 10/2006 | Majjasie et al. |
| 7,130,822 | B1 | 10/2006 | Their et al. |
| 7,131,069 | B1 | 10/2006 | Rush et al. |
| 7,133,835 | B1 | 11/2006 | Fusz et al. |
| 7,136,467 | B2 | 11/2006 | Brockman et al. |
| 7,143,058 | B2 | 11/2006 | Sugimoto et al. |
| 7,146,337 | B1 | 12/2006 | Ward et al. |
| 7,149,744 | B1 | 12/2006 | Tenorio |
| 7,162,458 | B1 | 1/2007 | Flangan et al. |
| 7,177,836 | B1 | 2/2007 | German et al. |
| 7,181,017 | B1 | 2/2007 | Nagel et al. |
| 7,203,662 | B2 | 4/2007 | Das et al. |
| 7,206,768 | B1 | 4/2007 | DeGroeve et al. |
| 7,222,081 | B1 | 5/2007 | Sone |
| 7,243,139 | B2 | 7/2007 | Ullman et al. |
| 7,254,588 | B2 | 8/2007 | Sung et al. |
| 7,257,560 | B2 | 8/2007 | Jacobs et al. |
| 7,263,506 | B2 | 8/2007 | Lee et al. |
| 7,324,976 | B2 | 1/2008 | Gupta et al. |
| 7,327,952 | B2 | 2/2008 | Enomoto |
| 7,340,433 | B1 | 3/2008 | Kay et al. |
| 7,346,575 | B1 | 3/2008 | Ahles et al. |
| 7,363,261 | B2 | 4/2008 | Whitehead et al. |
| 7,373,365 | B2 | 5/2008 | Varadarajan et al. |
| 7,386,502 | B1 | 6/2008 | Butcher, III |
| 7,392,934 | B2 | 7/2008 | Hahn-Carlson et al. |
| 7,415,471 | B1 | 8/2008 | Coleman |
| 7,415,617 | B2 | 8/2008 | Ginter et al. |
| 7,433,845 | B1 | 10/2008 | Flitcroft et al. |
| 7,437,310 | B1 | 10/2008 | Dutta |
| 7,448,063 | B2 | 11/2008 | Freeman et al. |
| 7,475,024 | B1 | 1/2009 | Phan |
| 7,496,519 | B2 | 2/2009 | Hahn-Carlson et al. |
| 7,499,875 | B1 | 3/2009 | May et al. |
| 7,529,706 | B2 | 5/2009 | Kulasooriya et al. |
| 7,536,354 | B1 | 5/2009 | DeGroeve et al. |
| 7,536,362 | B2 | 5/2009 | Starr et al. |
| 7,548,884 | B1 | 6/2009 | Thomas |
| 7,558,793 | B1 | 7/2009 | Topolovac et al. |
| 7,574,363 | B2 | 8/2009 | Bodin |
| 7,574,386 | B2 | 8/2009 | Hahn-Carlson et al. |
| 7,587,363 | B2 | 9/2009 | Cataline et al. |
| 7,590,575 | B2 | 9/2009 | Yu et al. |
| 7,617,146 | B2 | 11/2009 | Keaton et al. |
| 7,627,499 | B2 | 12/2009 | Hahn-Carlson |
| 7,634,455 | B1 | 12/2009 | Keene et al. |
| 7,640,195 | B2 | 12/2009 | Von Zimmermann et al. |
| 7,660,788 | B1 | 2/2010 | Clark |
| 7,693,791 | B2 | 4/2010 | Hahn-Carlson et al. |
| 7,702,563 | B2 | 4/2010 | Balson et al. |
| 7,725,372 | B2 | 5/2010 | Hahn-Carlson |
| 7,765,136 | B2 | 7/2010 | Northington et al. |
| 7,822,653 | B2 | 10/2010 | Hahn-Carlson et al. |
| 7,890,395 | B2 | 2/2011 | Phelan |
| 7,925,551 | B2 | 4/2011 | Hahn-Carlson et al. |
| 7,970,671 | B2 | 6/2011 | Hahn-Carlson et al. |
| 8,050,938 | B1 | 11/2011 | Green et al. |
| 8,060,410 | B2 | 11/2011 | Hahn-Carlson |
| 8,069,054 | B2 | 11/2011 | Hahn-Carlson et al. |
| 8,103,575 | B1 | 1/2012 | Hinkle |
| 8,126,785 | B2 | 2/2012 | Hahn-Carlson et al. |
| 2001/0009002 | A1 | 7/2001 | Logan et al. |
| 2001/0011241 | A1 | 8/2001 | Nemzow |
| 2001/0014878 | A1 | 8/2001 | Mitra et al. |
| 2001/0025262 | A1 | 9/2001 | Ahmed |
| 2001/0032154 | A1 | 10/2001 | Schummer |
| 2001/0032171 | A1 | 10/2001 | Brink et al. |
| 2001/0032183 | A1 | 10/2001 | Landry |
| 2001/0039522 | A1 | 11/2001 | Saxon |
| 2001/0047311 | A1 | 11/2001 | Singh |
| 2001/0056395 | A1 | 12/2001 | Khan |
| 2002/0007302 | A1 | 1/2002 | Work et al. |
| 2002/0016765 | A1 | 2/2002 | Sacks |
| 2002/0026374 | A1 | 2/2002 | Moneymaker et al. |
| 2002/0032649 | A1 | 3/2002 | Selvarajan |
| 2002/0035488 | A1 | 3/2002 | Aquila et al. |
| 2002/0038277 | A1 | 3/2002 | Yuan |
| 2002/0038305 | A1 | 3/2002 | Bahl et al. |
| 2002/0040304 | A1 | 4/2002 | Shenoy et al. |
| 2002/0042782 | A1 | 4/2002 | Albazz et al. |
| 2002/0046081 | A1 | 4/2002 | Albazz et al. |
| 2002/0046125 | A1 | 4/2002 | Speicher et al. |
| 2002/0046147 | A1 | 4/2002 | Livesay et al. |
| 2002/0046169 | A1 | 4/2002 | Keresman et al. |
| 2002/0048369 | A1 | 4/2002 | Ginter et al. |
| 2002/0049622 | A1 | 4/2002 | Lettich et al. |
| 2002/0055850 | A1 | 5/2002 | Powell et al. |
| 2002/0059122 | A1 | 5/2002 | Inoue et al. |
| 2002/0059134 | A1 | 5/2002 | Ebbs et al. |
| 2002/0062278 | A1 | 5/2002 | Ingram et al. |
| 2002/0065736 | A1 | 5/2002 | Willner et al. |
| 2002/0065738 | A1 | 5/2002 | Riggs et al. |
| 2002/0069177 | A1 | 6/2002 | Carrott et al. |
| 2002/0072956 | A1 | 6/2002 | Willems et al. |
| 2002/0077978 | A1 | 6/2002 | O'Leary et al. |
| 2002/0087344 | A1 | 7/2002 | Billings et al. |
| 2002/0087455 | A1 | 7/2002 | Tsagarakis |
| 2002/0095355 | A1 | 7/2002 | Walker et al. |
| 2002/0103661 | A1 | 8/2002 | Albazz et al. |
| 2002/0107761 | A1 | 8/2002 | Kark et al. |
| 2002/0107794 | A1 | 8/2002 | Furphy et al. |
| 2002/0111886 | A1 | 8/2002 | Chenevich et al. |
| 2002/0116288 | A1 | 8/2002 | Nakajima |
| 2002/0116334 | A1 | 8/2002 | Bennett et al. |
| 2002/0116348 | A1 | 8/2002 | Phillips et al. |
| 2002/0120570 | A1 | 8/2002 | Loy |
| 2002/0123919 | A1 | 9/2002 | Brockman et al. |
| 2002/0123973 | A1 | 9/2002 | Eccles et al. |
| 2002/0143858 | A1 | 10/2002 | Teague et al. |
| 2002/0147655 | A1 | 10/2002 | Say |
| 2002/0156797 | A1 | 10/2002 | Lee et al. |
| 2002/0161719 | A1 | 10/2002 | Manning et al. |
| 2002/0174034 | A1 | 11/2002 | Au et al. |

(56) References Cited

U.S. PATENT DOCUMENTS

| | | |
|---|---|---|
| 2002/0184527 A1 | 12/2002 | Chun et al. |
| 2002/0194174 A1 | 12/2002 | Calkins et al. |
| 2002/0198829 A1 | 12/2002 | Ludwig et al. |
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1 | 3/2003 | Klein Twennaar |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Daum |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson et al. |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Clubb et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchison et al. |
| 2005/0216368 A1* | 9/2005 | Wechsel .......................... 705/28 |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson et al. |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287953 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299769 A1 | 12/2007 | Fowler et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0205054 A1 | 8/2010 | Hahn-Carlson et al. |

(56) References Cited

U.S. PATENT DOCUMENTS

| | | |
|---|---|---|
| 2011/0004544 A1 | 1/2011 | Baum |
| 2011/0029404 A1 | 2/2011 | Hahn-Carlson et al. |
| 2012/0158558 A1 | 6/2012 | Hahn-Carlson et al. |

FOREIGN PATENT DOCUMENTS

| | | |
|---|---|---|
| EP | 0425421 A2 | 5/1991 |
| EP | 0779587 A2 | 6/1997 |
| FR | 2543327 A1 | 9/1984 |
| GB | 2398894 | 9/2004 |
| GB | 2398894 A | 9/2004 |
| JP | 2001312680 A | 11/2001 |
| WO | WO 97/07468 A1 | 2/1997 |
| WO | WO 99/08218 A1 | 2/1999 |
| WO | WO 00/62225 A1 | 10/2000 |
| WO | WO 01/09782 A2 | 2/2001 |
| WO | WO 01/35570 A1 | 5/2001 |
| WO | WO 01/48659 A1 | 7/2001 |
| WO | WO 01/82193 A1 | 11/2001 |
| WO | WO 01/88813 A1 | 11/2001 |
| WO | WO 0182193 | 11/2001 |
| WO | WO 0188813 | 11/2001 |
| WO | WO 01/26017 A2 | 12/2001 |
| WO | WO 02/21405 A1 | 3/2002 |
| WO | WO 02/006920 A2 | 9/2002 |
| WO | WO 2005/124635 A2 | 12/2005 |
| WO | WO 2006/071881 A2 | 7/2006 |
| WO | WO 2008/045793 A1 | 4/2008 |

OTHER PUBLICATIONS

Spencer et al., "JIT Systems and external logistices suppliers," International Journal of Operations & Production Management, v14, n6, pp. 60-74, 1994.
White, How Computers Work, Sep. 1999, 93 pp.
Professional Builder (1993) www.highbeam.com, Contracts & Law: Part III 8 pp.
Xcitek Press Release, "U.S. Bank Selects Xcitek for Corporate Actions Data and XSP for Corporate Actions Automation," NY, NY, Dec. 2003, 1 pp.
Berhad, "Fueling financial oil for the economy," The New Straits Times Press (Malaysia), Dec. 10, 2001, 3 pp.
Singh, "A new road to recovery," Risk, pp. 108-110, Sep. 2004.
"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.
Brochure: SAP Supplier Relationship Management—At a Glance, SAP, 2003, 16 pp.
Brochure: Self-Service Procurement: Slashing Costs and Saving Time, SAP, 2003, 12 pp.
Electronic Commerce News, "Sarbanes-Oxley Continue to be Key Issue in Corporate Payments Space," Sep. 1, 2003, v8, issue 18, 7 pp.
Fletcher, "Limits on reinsurance offsets sought by California regulator," Business Insurance, May 8, 1995 4 pp.
Denver Business Wire, "JD Edwards Continues to drive network-centric applications delivery with OneWorld enhancements," Jun. 16, 1997, p. 06160089.
Notice from the European Patent Office concerning business methods, dated Oct. 1, 2007, 2 pp.
Egan, "Administrative Orders from the Office of the Governer of Alaska," Jul. 18, 1972, 3 pp. http://www.gov.state.ak.us/admin-orders/018.html.
Bodnar, "Estimating Exchange Rate Exposure: Issues in Model Structure," Financial Management v32, n1, pp. 35-67, 2003.
Plewka, "Germany seizes the Emu initiative," International Tax Review, v8, n5, pp. 43-46, May 1997.
Huang, "Exchange Risk and Exchange Rate Pass-Through," v67/02-A of Dissertation Abstracts International, 2005.
U.S. Appl. No. 13/406,247, by Dean Hahn-Carlson, filed Feb. 27, 2012.
Office Action from U.S. Appl. No. 11/151,748, dated Mar. 18, 2008, 21 pp.
Response to Office Action dated Mar. 18, 2008, from U.S. Appl. No. 11/151,748, filed Jun. 16, 2008, 13 pp.
Final Office Action from U.S. Appl. No. 11/151,748, dated Oct. 7, 2008, 25 pp.
Response to Final Office Action dated Oct. 7, 2008, from U.S. Appl. No. 11/151,748, filed Dec. 8, 2008, 14 pp.
Advisory Action from U.S. Appl. No. 11/151,748, dated Dec. 31, 2008, 3 pp.
Response to Advisory Action from U.S. Appl. No. 11/151,748, dated Jan. 7, 2009, 16 pp.
Office Action from U.S. Appl. No. 11/151,748, dated Mar. 27, 2009, 28 pp.
Response to Office Action dated Mar. 27, 2009 from U.S. Appl. No. 11/151,748, filed Jun. 26, 2009, 15 pp.
Notice of Allowance from U.S. Appl. No. 11/151,748, dated Oct. 23, 2009, 20 pp.
Amendment After Allowance—Rule 312 for U.S. Appl. No. 11/151,748, filed Jan. 25, 2010, 13 pp.
International Preliminary Report on Patentability Jun. 5, 2012 for corresponding PCT Application No. PCT/US05/20630, 3 pgs.
McKeefry, "Seeking microcontrollers desperately," Electronic Buyers News, n972, Sep. 11, 1995, 6 pp.
Mallory, Great Plains Accounting v.7 (Great Plains Software's accounting software) (Product Accouncement), Apr. 22, 1993, 3 pp.
Russell, "Kitting out is now in (Use of component kits is expanding as distributors develop added-value activities)," Electronic Times (online), n. 852, Apr. 17, 1997, 4 pp.

\* cited by examiner

ORDER-RESOURCE FULFILLMENT AND MANAGEMENT SYSTEM AND APPROACH

RELATED PATENT DOCUMENTS

This patent document is a continuation under 35 U.S.C. §120 of U.S. patent application Ser. No. 11/151,748 filed on Jun. 9, 2005 (U.S. Pat. No. 7,693,791) which claims benefit under 35 U.S.C. §119(e) of U.S. Provisional Patent Application No. 60/578,689 filed on Jun. 9, 2004, and entitled "Automated Transaction Processing System and Approach."

FIELD OF THE INVENTION

The present invention is directed to transaction processing and, more specifically, to the processing and management of interactions relating to transactions involving goods and/or services.

BACKGROUND

Transaction processing has typically involved intensive manual effort and, in instances where automatic processing has been used, intensive user intervention. For example, transaction processes involve the use of a variety of transaction documents such as orders, invoices, receipts and bills of lading (BOL). These types of transaction documents include information associated with the transaction that is used by parties to the transaction to monitor and process the transaction.

Transaction documents are electronically processed for a multitude of different types of applications. Interaction data, (e.g., electronic or physical documents) describing characteristics of a particular transaction interaction is often encountered in varied temporal order at central transaction locations that assemble these documents into logical packages for automated processing. For example, when a transaction involves the sale of a product from a seller to a buyer, there are often multiple parties to the transaction in addition to the buyer and seller, such as shippers, financial institutions, distributors and regulatory agencies (e.g., customs, taxation agencies). Each of these parties often provides one or more different types of documents that relate to the transaction. Often, the documents are not in a format that is readily discernible relative to documents from other parties, requiring extensive effort to organize the documents into categories or transactions.

A variety of transactions are particularly susceptible to processing difficulties such as those relating to document identification and categorization. For example, pre-payment reconciliation and auditing for a particular transaction are often automatically carried out electronically at a central processor. Documents used for these functions can arrive at the central processor in either an untimely manner or a format that is unsuitable for identification and categorization of the documents into particular transactions. As another example, a customs clearance document referencing a particular invoice could arrive at a central processor before the invoice, which could also arrive before the actual order arrives. Without an invoice to tie the customs clearance document, the central processor has difficulty managing the document. Similarly, without an order to attribute an invoice to, the central processor may be unable to process the invoice (e.g., is unable to audit the invoice against the order).

Another type of incompatibility that has made transaction processing difficult is related to the common scenario wherein reference numbers used by different parties to identify a particular transaction are not compatible. For example, in transactions involving buyers and sellers, sellers maintain transaction data organized by reference numbers generated by the seller. Buyers typically must access the data using a seller's reference number rather than the buyer's reference number. In addition, buyers and sellers typically use different reference numbers for different characteristics of the transaction, making the monitoring and management of the transaction difficult.

As more and more documents are required to fully articulate interactions, this problem of managing documents and other interaction data and, in particular, of correlating documents and other interaction data with a proper transaction, becomes increasingly challenging. Manual parsing and categorization of these documents is expensive, time consuming and susceptible to error. Previously available automated approaches are generally limited in applicability to certain types of documents or certain inflexible methods of document identification and categorization.

Payment and billing related aspects of traditional transactions are particularly susceptible to billing errors and fraud. For example, there often is little to no connection between the delivery of goods and the billing for the delivery and/or the goods. This may result in double billing, no billing at all, or overbilling. Auditing errors that cause incorrect billing or payment may also occur. In addition, payment can often be delayed while aspects of a particular transaction are being audited and/or disputed, particularly when different transaction documents must be manually parsed and processed. For example, documents from different parties to a transaction must often be parsed and compared to relate data from one document to another in a manner that will facilitate billing. Delay associated with billing reduces working capital resources for parties to the transaction waiting for payment.

Additional costs arise as a result of existing inefficiencies in a variety of transaction-processing approaches. Many of the costs are individually small, but very large in the aggregate. For example, typical parties to transactions incur administrative costs including those relating to the costs for creating and delivering transaction documents, resolving billing disputes, providing a signed copy of documents to other parties and posting accounts receivable. In addition, the cost of parsing, recognizing and categorizing documents related to these and other items add to the administrative costs of transactions.

An additional challenge to transaction management involves the inability to obtain immediate information regarding a transaction. Transaction data from one party is typically not readily available to other parties involved with the transaction without direct access to private-party systems. Since the process is largely conducted manually, it is very difficult to track a transaction and real-time data is particularly difficult to come by. For example, there are various manual steps involved in order to learn of the status of shipment or payment. If a shipper wants to know if a carrier delivered the goods for a particular transaction and if the payment has been made, the shipper often must contact the carrier and/or the appropriate financial institution.

The above and other difficulties in the management and coordination of transactions have presented challenges to the effective and efficient management of transactions.

SUMMARY

The present invention is directed to overcoming the above-mentioned challenges and others related to the types of approaches and implementations discussed above and in other applications. The present invention is exemplified in a number of implementations and applications, some of which are summarized below.

According to an example embodiment of the present invention, interactions are managed using an approach generally involving the use of transaction status criteria for processing payment-related aspects of the interactions.

In a more particular example embodiment of the present invention, interaction status conditions related to order fulfillment and related payments are monitored and/or processed as received. When changes to order fulfillment and/or related payment(s) occur and/or when new order fulfillment and payment information is received, these changes are used to automatically update status conditions. The updated status conditions are implemented for one or more of a variety of transaction processing and management approaches.

In another example embodiment of the present invention, a transaction-processing system is adapted for managing payment resources for transactions involving merchant offerings among parties including buyers and sellers. The system includes a data storage arrangement, including one or more data storage devices at one or more locations, adapted to store order-related information for a transaction between a buyer and a seller. Often, the order-related information includes data in fields associated with historical fulfillment and billed quantities for ordered items of the transaction. A computer (e.g., processing) arrangement is adapted, for a particular ordered item, to compare billed quantity information on an incoming invoice with historical fulfillment and billed quantity information for the ordered item in the data storage arrangement. If the billed quantity on the incoming invoice is no more than the difference between the historical fulfillment quantity and billed quantity information for the ordered item in the data storage arrangement, payment of the invoice is authorized. In connection with the authorization, historical billed quantities for the ordered item are updated in the data storage arrangement to include the billed quantity in the incoming invoice.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of transaction approaches and interactions, and has been found to be particularly useful for applications involving the processing of transactions and related aspects thereof. While the present invention is not necessarily limited to such approaches, various aspects of the invention may be appreciated through a discussion of various examples using these and other contexts.

According to an example embodiment of the present invention, transaction interactions are managed using an approach that facilitates the monitoring of interaction status conditions related to order fulfillment and related payments. The management involves a variety of characteristics and can be tailored for specific implementations. For example, where parties to a transaction agree upon certain business rules, the transaction interactions are managed as a function of the business rules. Business rules relating to delivery, pricing, payment and other characteristics are readily implemented in this manner for automatically managing one or more of a variety of aspects of transaction interactions. When changes to order fulfillment and/or related payment(s) occur, these changes are used to automatically update status conditions.

In one implementation, resources available for processing invoices for a particular transaction (e.g., express or implied order or contract) are monitored. When unbilled resources are available, these resources are identified as those to which payment can be made. For instance, when an invoice is received for a particular quantity of goods and/or services, it is useful to compare the invoiced quantity with the quantity received to determine whether payment should be made. This approach can be used, for example, to ensure receipt of goods/services before payment is made and/or for ensuring that a sufficient quantity has been received that warrants payment (e.g., where payment is effected only when a threshold quantity has been delivered or invoiced). In addition, after an invoice for an order is created, it is useful to compare the invoice against subsequent invoices to ensure that payment has not already been made for items listed. For instance, a comparison can be made to determine whether the sum of quantities billed on previous invoices is less than the fulfilled quantities (and wherein payment is subsequently made if the sum of previously billed quantities is less than fulfilled quantities). With this approach, the fulfillment status of an order is available for processing documents such as invoices, facilitating the ability to determine, for example, characteristics relating to the quantity of goods or payment therefor.

In some instances, other conditions relative to the delivery of goods and/or services are used, in addition to historical fulfillment and delivery data, for facilitating payment for transactions. For example, where transaction parties agree to payment-related terms that are tied to the time of performance (e.g., goods and/or services to be delivered within a particular time period), payment for quantities fulfilled in a timely manner is authorized in accordance with agreed payment terms for on-time fulfillment. Correspondingly, payment for quantities fulfilled in an untimely manner is authorized in accordance with agreed payment terms for fulfillment that is not on time. In certain applications, the historical fulfillment data is updated as a function of the condition of goods and/or services at time of performance; where a condition of certain items is acceptable while the condition of other items is unacceptable, the historical fulfillment data is updated to reflect the amount of acceptable items. When payment is authorized as a function of historical fulfillment quantities, these fulfillment quantities reflect the condition of the items.

A variety of interactions can be monitored and managed using these approaches, with aspects of the management relating to interactions established between different parties to a transaction. Changes made to interaction data from a particular source are monitored and, when appropriate, used to update interaction data from and/or in other sources. For example, transaction-based documents applying to a common transaction can be monitored in this manner, with an update to a document and/or data field being used to make corresponding updates to one or more other documents and/or data fields for the same common transaction, or for different transactions pertaining to a particular party to the transactions. One such example involves the monitoring of status fields relating to orders; when a particular field such as that reflecting a quantity received is updated a corresponding update can be made to related fields. This approach is applicable, for example, to related fields such as amount payable, extended price, service charge, tax and total fields.

In one implementation, related data fields and/or documents as discussed above are automatically linked for a particular transaction, in a manner commensurate with a transaction party to which the related data fields apply. In one instance, where a transaction between a buyer and a seller specifies a delivered quantity of a particular good, transaction data fields stored on behalf of each of the buyer and the seller specifying the delivered are automatically linked. In this regard, when the buyer receives goods and updates its delivered quantity data field to indicate the receipt, a corresponding update is made to the seller's delivered quantity data field to reflect the receipt acknowledged by the buyer. Many such links are selectively implemented, at the discretion of parties to each particular transaction and, in some applications, as applicable to an administrator that facilitates transaction processing on behalf of buyers and sellers.

In another implementation, business rules are used to manage order fulfillment for one or more transactions. When a particular transaction group is established, for example using a particular storage location and associated ID for the location to store documents, the transaction group is monitored for data fields associated with fulfillment. When new fulfillment data is received and/or when existing fulfillment data is altered, the fulfillment data is used to automatically process a related function. For instance, when a notice (e.g., receipt of order) indicating that an order has been fulfilled is received, corresponding data fields in other documents are accordingly updated. Any response dictated by the business rules, such as the execution of payment for the fulfilled order, is then executed. For general information regarding transactions and for specific information regarding transactions and the use of a storage (e.g., anchor) location to which one or more example embodiments discussed herein may apply, reference may be made to U.S. patent application Ser. No. 10/864,761 (USBA.120PA) entitled "Automated Transaction Processing System and Approach," filed Jun. 9, 2004 and fully incorporated herein by reference.

Figure 1:
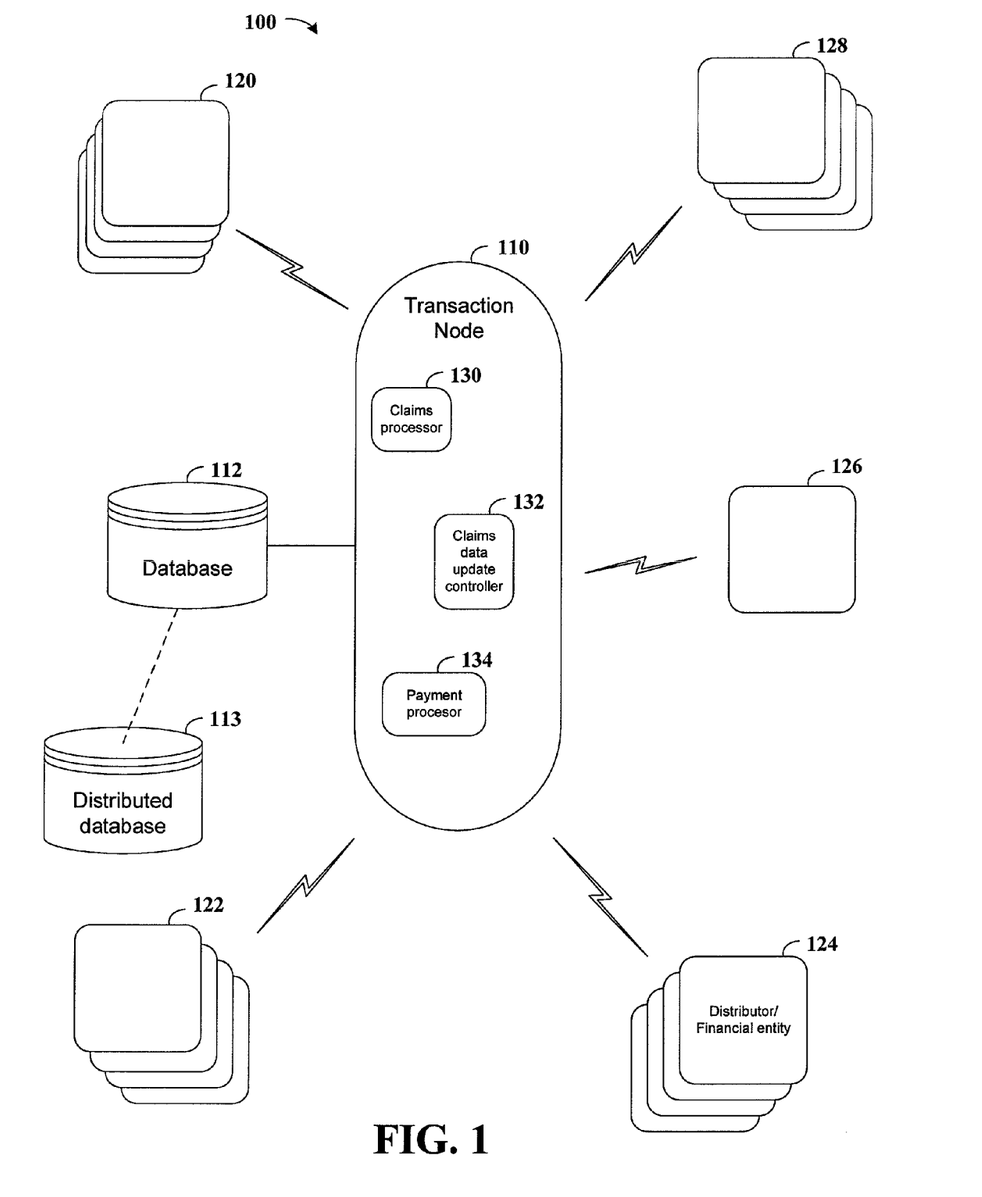
FIG. 1 shows a transaction processing arrangement, according to an example embodiment of the present invention.

Referring now to FIG. 1, a transaction processing arrangement 100 is adapted to automatically monitor and process transaction data, according to another example embodiment of the present invention. The transaction processing arrangement 100 includes a central transaction node 110 that is a central location for the communication and processing of transaction-related data. The central transaction node 110 is in communication with a database 112 where transaction-related information is stored. The database 112 is shown coupled to the central transaction node 110; however, in various implementations, some or all of the database is part of the central transaction node, is located at a remote location and/or includes a plurality of data storage circuits at different locations.

A plurality of user nodes 120, 122, 124, 126 and 128 are communicatively coupled with the central transaction node 110. The user nodes 120-128 may, for example, include one or more of a buyer, seller, distributor, shipper, carrier, customs agency, national security agency, financial institution or other type of individual, group or agency that would typically be involved in a transaction. These user nodes can interact with the central transaction node 110 for providing transaction-related information, such as orders, invoices, shipping documents, payment authorization, payment execution, customs documents, security documents and others that are stored in the database 112. This transaction-related information, including changes thereto, is monitored and processed by the central transaction node 110 using common attributes to automatically update information for a particular transaction. For example, when transaction data stored in the database 112 identifies a fulfillment status of an order for a particular transaction, the fulfillment status is processed and used for furthering the transaction to which the transaction data applies. Where this fulfillment status is applicable to more than one field and/or document (i.e., an amount received field is applicable to an amount payable field), related fields are accordingly updated in response to one of the fields being changed.

In one implementation, transaction-related information is parsed and grouped by the central transaction node 110 for storing in the database 112 using common attributes to automatically group information from a particular transaction together, such as in U.S. patent application Ser. No. 10/864,761, referenced above. For instance, transaction data can be grouped as a function of predefined anchor-type categories and related transaction-profile attributes. Selected ones of the transaction-profile attributes are used to form anchor data that identifies the particular transaction and/or identifies information for the transaction, such as order, fulfillment or transaction participant information. These predefined anchor-type categories are implemented with the database 112 and the central transaction node 110 monitoring related categories; when a change in one category affects another category, the other category is correspondingly updated. In addition, notification of such an update is optionally automatically sent to one of the user nodes 120-128 to alert users of the update (e.g., to alert a user of a payment received or other transaction-type information).

In one implementation, the anchor data has an actual physical representation in the database 112 at an anchor location, and thus can be used to access documents stored in the database and identified by the anchor. In another implementation, configuration data is used to enable parties to a transaction to define data elements of the documents that are to be used to automatically relate documents to one other and/or for automatically updating other documents. Using these approaches, the anchor data can effectively be used to broadcast criteria that will allow individual transactions to latch on to a particular interaction represented by a given anchor ID. In addition, such anchor data can be used to identify related documents for updating in response to changes in transaction data from other documents having the same anchor ID. These changes are applicable to fields indicating the status of resources such as billed and/or unbilled quantities for a particular order as relative to a multitude of invoices for that order.

In another implementation, the central transaction node 110 is further adapted to grant and control information exchange with the database 112 as a function of inputs received from the nodes 120-128, such as authorization inputs and document-specific inputs. When users at one of the nodes 120-128 attempt to send information to or retrieve information from the central transaction node 110, authorization information from the users is used to control the information transfer. The authorization information may include, for example, access-type information (e.g., a password or user ID) or simply document information that the central transaction node 110 recognizes.

When information exchange is controlled with document information and one of the nodes 120-128 sends transaction data (e.g., an electronic document) to the central transaction node 110, the database 112 is parsed to match the transaction data with stored information. If a match is found, the central transaction node processes the matching data to determine whether the received transaction data belongs to the same transaction as the matching data. If so, the received transaction data is assigned an anchor ID pertaining to the matching data and is stored in the database 112 with the assigned anchor ID grouping the matching data together.

If a match is found but there are restrictions, the central transaction node processes the received data according to restriction rules, if any, programmed to the central transaction node. For example, where one anchor ID is assigned for each order and when there is an existing order in the database 112 under the matching anchor ID, a new anchor ID is created. The received transaction data as well as matching data that is unrestricted are stored under the new anchor ID. For instance, when matching invoice data has been found but the invoice includes more than one order, a different anchor ID is created for each order, both including the same invoice but having separate orders. These and other restrictive-type approaches are programmed to the central transaction node, depending upon the implementation.

When a match is found, the central transaction node 110 uses business rules to identify whether the received data warrants a response, such a corresponding change to other data related to the received data or a notification to one of the user nodes 120-128. In this regard, the central transaction node 110 establishes a relationship between certain data fields in different locations. For example, by using a one-to-one correlation, data in two locations can be maintained consistently where both locations identify the same or similar data, such as a quantity of ordered product, shipment status or other type of transaction characteristic. When data in one of the locations is updated, the value from that location is also updated to the other one of the locations. For example, as discussed above, certain types of data received by the central transaction node 110 can be used to correspondingly update other information having a relationship with the received data. Once such approach involves the update of a resource field applicable to product or service quantities, as well as the update of corresponding payment fields relating to the quantities as discussed, for example, above in connection with the receipt of multiple invoices for a particular order.

In another example, a relational function is used to automatically update a related data field. In this example, when data in one of the locations is updated, the central transaction node 110 processes the updated data to generate an update to the other one of the locations where a one-to-one correlation does not exist. For instance, when a particular data field applies to an order quantity and another data field applies to a monetary amount representing the order quantity, a change in order quantity is processed to generate a corresponding change in monetary amount for the order. A multitude of such relationships can be established and maintained by the central transaction node 110, some of which are discussed further below.

Referring again to the matching of data received by the central transaction node with data stored in the database 112, a new anchor ID is selectively created for the received transaction data when no match is found between received transaction data and data in the database 112. This new anchor ID, along with the received transaction data, is stored in the database 112 and thus establishes a new transaction. When additional transaction data matching the newly-stored data is subsequently received, the central transaction node processes the matching data as discussed above.

In another implementation, transaction data received at the central transaction node 110 is cross-referenced with security-type data stored in the database 112, prior to using the received data to update corresponding fields. When transaction data matches certain security-controlled criteria, the transaction to which the transaction data belongs can be flagged or otherwise audited. For instance, where a product identification type matches a product type that is susceptible to security control, the transaction may be halted for auditing and approval by a third party. Such approval may, for example, also take the form of a transaction document that is sent to the central transaction node 110, where the approval is used to further the transaction (i.e., allow the corresponding fields to be updated). Security-related data received by the central transaction node 110 is monitored and used to process the transaction to which it applies, for example by updating an approval status for a particular field update to an order for which an invoice is provided. Correspondingly, a field representing an approval to proceed with a transaction can be updated when approval is received.

As discussed above, the transaction processing arrangement 100 shown in FIG. 1 can be implemented in a variety of manners for processing transaction information. In one particular implementation, the transaction central transaction node 110 carries out functions for addressing multilevel transactions involving more than two transaction parties. Each party interacts via the transaction processing arrangement, with fund transfers being executed with all transaction parties in a variety of manners, depending upon the situation.

In one implementation, a transaction involves a distributor or other mid-level entity that facilitates a transaction between a seller (or sellers) and buyer (or buyers). The distributor obtains transaction-related products and/or services from one or more sellers, and in turn sells these transaction-related products and/or services to end buyers. In some instances, the distributor finds buyers for products that the seller is offering, without necessarily further facilitating the transaction. In other instances, the distributor functions in one or more aspects of facilitating the transaction, such as by coordinating and/or effecting delivery, storing goods and more.

For discussion purposes with this implementation, and referring to FIG. 1, user node 120 is the seller node, user node 122 is the buyer node, and user node 124 is the distributor node. When the buyer 122 and the distributor 124 agree on a price for the transaction, business rules and/or other information characterizing this agreement is stored in the database 112 for use by the central transaction node 110. The distributor 124 also agrees on a price with the seller 120, with the information accordingly being stored in the database 112.

When a transaction involving goods and/or services provided by the seller 120 to the buyer 122 is facilitated by the distributor 124, the central transaction node 110 uses information stored in the database 112 to process the transaction. Effectively, the seller 120 gets paid based upon its agreement with the distributor 124, and the buyer 122 gets charged for the transaction as detailed by the buyer's agreement with the distributor 124. Any net difference between what the seller gets paid and the buyer pays is realized at the distributor. Typically, this approach involves the buyer 122 paying a higher price than what the seller is paid and the distributor receiving a markup that is the difference between the seller's price and the buyer's price. However, in some instances, this approach may also involve the distributor 124 taking a loss (i.e., if the distributor has contracted with the buyer 122 for a particular price and the seller 120's price has increased). In addition, the distributor may add value to the transaction, such as via shipping, insurance, processing or other service; in this regard, the distributor may also charge the buyer directly for these value-added activities.

Payments between the buyer, seller and distributor are effected via the central transaction node 110, which interacts with financial institutions for transferring funds. For instance, the central transaction node can automatically direct funds from the buyer 122's financial institution to both the seller 120's financial institution and the distributor 124's financial institution, based on information stored in the database 112. With this approach, the seller 120 can receive funds directly, rather than from the distributor 124, which would in turn need to collect from the buyer 122.

As discussed above, the distributor (or other mid-level entity) approach may further involve multiple buyers and/or multiple sellers. Beginning with multiple buyers, and referring again to FIG. 1 as an example, nodes 120, 122 and 124 are implemented as seller, buyer and distributor nodes as discussed above. In this instance, nodes 126 and 128 are additional buyer nodes. When all three buyer nodes 122, 126 and 128 engage in individual transactions with the distributor node 124 for products that the distributor node obtains via the seller node 120, the central transaction node 110 facilitates payment between all parties. For example, payment from financial institutions for all three buyer nodes is carried out directly to the seller node 120's financial institution, with a (markup/service charge) portion of each payment being directed to the distributor node 124's financial institution. While the seller node 120 may simply be contracting with the distributor node 124, payment for the transaction may come directly from multiple financial institutions serving the buyer nodes 122, 126 and 128.

Multiple sellers may be implemented, similarly to the above-discussed approach with multiple buyers, for facilitating a single transaction between the distributor node 124 and the buyer node 122. In this instance, nodes 126 and 128 are additional seller nodes. The distributor node 124 contracts individually with each seller node 120, 126 and 128 for goods and/or services. When the buyer node 122 contracts with the distributor node 124 for the goods and/or services, the distributor node uses one or more of the seller nodes 120, 126 and 128 to fulfill the contract. The central transaction node 110 facilitates the transfer of funds between the buyer node 122 and the seller nodes 120, 126 and 128 as a function of the amount of goods and/or services provided by each seller node. For example, when the transaction involves products, the amount of product that is provided by each seller node is used to determine the amount that the seller node is to be paid. Similarly, when the transaction involves a service such as shipping, the amount of service performed (e.g., corresponding to shipping distance, utility usage or other service work performed) is used to determine the amount that the seller is to be paid. The funds transfer is carried out using price-representing data stored in the database 112 that corresponds to goods and/or services of the transaction as agreed upon between the distributor node 124 and the seller nodes 120, 126 and 128.

In each of the above-discussed examples involving a distributor, the transfer of funds between the parties to the transaction is carried out using one or more of the approaches discussed herein, such as those directed to monitoring and processing resources available for payment. When changes to order fulfillment and/or related payment(s) occur, these changes are used to automatically update status conditions. These changes, status conditions and other monitored characteristics can be implemented by the central transaction node 110 and used as a basis upon which to characterize and process payment for a transaction. For instance, contract performance (fulfillment), or the level of contract performance, can be used by the central transaction node 110 to authorize payment for the transaction.

In one implementation, the above-discussed transaction approach involving a mid-level entity is further implemented individually among sellers and buyers. For instance, payment for goods and/or services provided to a particular buyer is based upon fulfillment to that buyer. A particular buyer's financial institution is accessed for funds transfer based on quality, quantity and/or other conditions of transaction fulfillment. Similarly, where multiple sellers are used for a particular transaction, payment to each seller is based upon the level of transaction fulfillment provided by the seller.

In another example embodiment of the present invention, the central transaction node 110 acts as the mid-level entity as discussed in one or more of the above examples, wherein buyer and seller nodes (of nodes 120-128) interact with the central transaction node 110 for contracting purposes. In this regard, the central transaction node (or a corresponding portion thereof) is managed by a mid-level type entity, either via internal or external control by the mid-level entity. In some instances, buyers and sellers contract for prices directly with the central transaction node 110. In other instances, buyers and sellers contract with each other for setting prices, and one or more of a buyer and seller party to a transaction contract further with the central transaction node 110 for facilitating the transaction. For example, a seller may contract with the central transaction node 110 to manage the seller's distribution, financial processes or other transaction-based functions, such that the buyer contracts with the seller directly but processes transactions via the central transaction node 110. Sellers interacting with the central transaction node 110 are effectively paid directly from buyers interacting with the central transaction node 110 for the sellers' goods and/or services. However, the central transaction node 110 (or mid-level entity functioning therewith) is paid a markup and/or a transaction fee for each transaction that it processes.

In various applications, including one or more of the above-discussed approaches discussed in connection with FIG. 1, a claims processor 130, claims data update controller 132 and/or a payment processor 134 are selectively implemented to respectively carry out transaction fulfillment processing, data field updates and payment facilitation. For example, where a seller 122 involved in a transaction between the seller and a buyer 120 submits a claim (i.e., in the form of an invoice) requesting payment against a particular transaction, the claims processor 130 is implemented to process the claim in a manner not inconsistent with that discussed above, to ascertain whether the claim is payable. That is, the claims processor 130 implements transaction-profile attributes and/or other information in the database 112 (or in a distributed database 113) indicative of conditions that would facilitate or deny payment. For example, where the buyer 120 has updated information indicating that goods for which such a claim is made have been received, the claims data update controller 132 updates related historical fulfillment information in the database 112 that can be used in authorizing payment for the claim. That is, historical fulfillment data is audited to ensure that it reflects information in the receipt data and, where such receipt data has not been updated to the historical fulfillment data, the claims data update controller 132 effects an update to the historical fulfillment data. The claims processor 130 uses the updated information to authorize payment (where such receipt is a condition upon which payment can be authorized, i.e., the payment is also audited and validated as a function of the receipt/fulfillment data). When payment is authorized, the payment processor 134 uses the authorization to facilitate payment to the seller 122 using, e.g., financial entity 124 and/or other financial entities to draw funds from, extend credit on behalf of, or otherwise facilitate payment from the buyer 120.

In some applications, the claims data update controller 132 monitors data in the database 112, in a distributed database 113 and/or at a user location such as a database implemented by the buyer 120 or the seller 122 (with appropriate access granted to the claims data update controller by the buyer or seller). When changes to data fields occur, the claims data update controller 132 implements transaction-profile attributes, user profiles or other information in the database 112 to determine whether the changes apply to related data fields. If such changes do apply, the claims data update controller implements such changes by updating the related data fields.

For example, when a buyer updates the fulfillment status of an order in response to receiving goods from a seller, the claims data update controller 132 uses such an update to update related fields as identified by the buyer, seller or other transaction party. Related data fields may include, for example, a data field specifying a payable status for a particular order in the database 112, or a fulfillment field for the order at a corresponding seller's database. Once such related fields are updated, the payment processor 134 facilitates payment as discussed above, where appropriate.

Figure 2A:
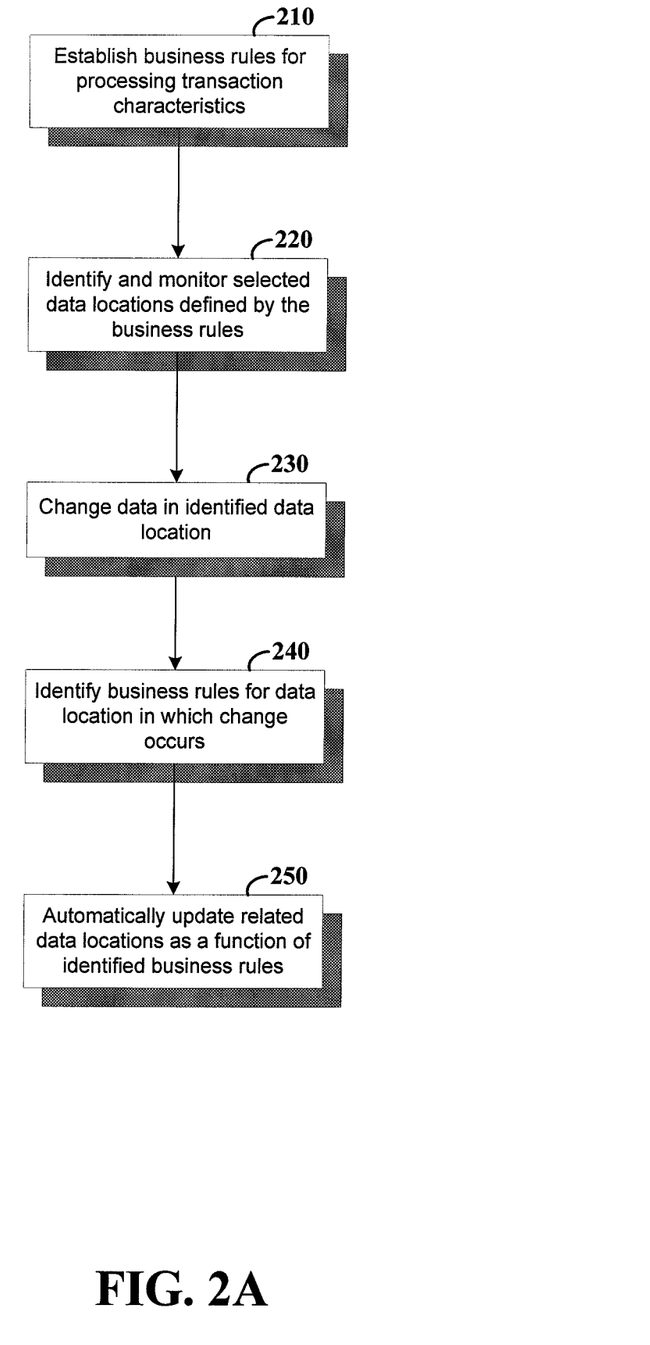
FIG. 2A is a flow diagram for a transaction monitoring approach, according to another example embodiment of the present invention.

FIG. 2A is a flow diagram for a transaction processing approach, according to another example embodiment of the present invention. At block 210, business rules are established for processing transaction characteristics. These business rules include one or more of a variety of rules that direct the processing of transaction data for generating a particular result, such as the generation of information that can be used to further a transaction. At block 220, select data locations for data defined by the business rules are identified for having a relationship with other data locations. In some applications, data locations are automatically linked for a transaction as a function of parties to the transaction, with data fields corresponding to similar or the same data for different transaction parties being automatically linked. In other applications, data fields for a particular transaction party are linked, such as by linking a specific receivable field for a particular transaction to a general receivable field that characterizes all receivables for the transaction party.

If data stored in a data location having a relationship with other data locations is made at block 230, business rules that apply to the data location exhibiting a change are identified (e.g., recalled) at block 240. The identified business rules are used in the automatic generation of updated information for related data locations at block 250. For instance, as discussed above, the generated information may include updated information for a transaction data location that is related to another location, with a change in a first data location being used with the business rules to execute a change in another data location. In another instance, the update to related data locations at block 250 involves the generation of data used to execute a transaction function, such as portion of a chain of events used for authorizing payment for a particular transaction. In the context of an invoice, changes in quantities ordered, paid for and delivered can be identified and processed using this approach.

Figure 2B:
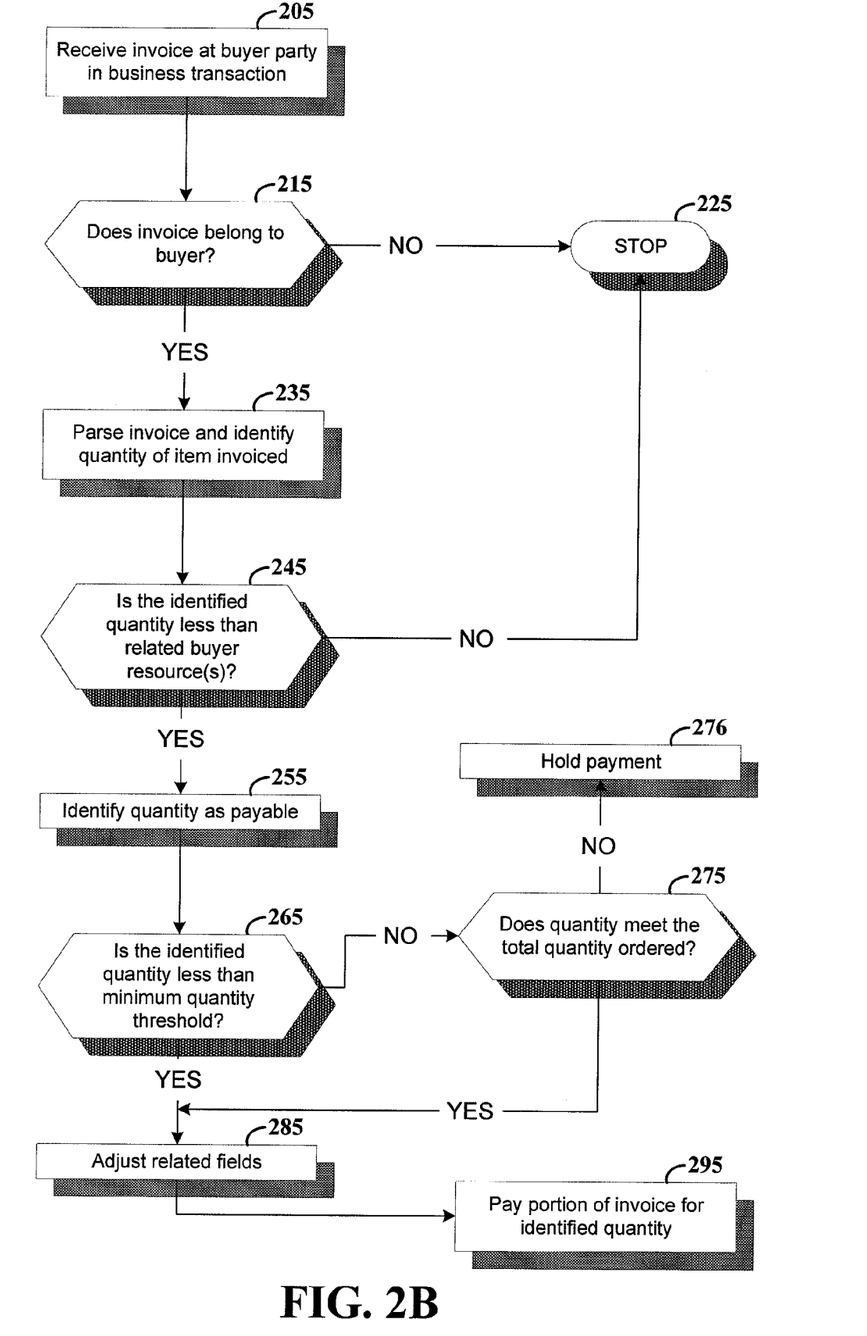
FIG. 2B is another flow diagram for a transaction monitoring approach, according to another example embodiment of the present invention.

FIG. 2B is another flow diagram showing an approach for processing an invoice for a transaction between a buyer and a seller, according to another example embodiment of the present invention. At block 205, an invoice is received by the buyer and processed to determine whether the invoice applies to an order belonging to the buyer. If the invoice does not apply to an order belonging to the buyer at block 215, the process stops at block 225, with an output indicating the failure optionally generated (e.g., a notice sent to the seller who created the invoice). If the invoice applies to an order belonging to the buyer at block 215, the invoice is parsed at block 235 to identify the quantity of a particular item invoiced. The identified quantity of a particular item is compared to related buyer resources at block 245 to determine whether the identified quantity being billed exceeds the amount fulfilled less the amount already invoiced (e.g., on a previous invoice). If the identified quantity is greater than the difference between the amount fulfilled and the amount previously invoiced (if applicable), the quantity is over-billed and the process stops at block 225 (e.g., with an optional output generated for notifying the seller of an over-billing situation and/or for updating related data fields). In one instance wherein the identified quantity is greater than the difference between the amount fulfilled and the amount previously invoiced at block 245, the quantity is adjusted to be equal to that difference (thus adjusted to pay for the total amount fulfilled), with the process continuing as follows. If the identified quantity is less than or equal to the difference between the amount fulfilled and the amount previously invoiced (if applicable), the identified quantity is determined to be payable at block 255.

Once the identified quantity is determined to be payable, the quantity is checked to ensure it meets a minimum payable quantity threshold at block 265. For example, a buyer may which to limit the payment of invoices to those exceeding a particular dollar amount to reduce costs associated with paying invoices. This approach is applicable, e.g., where payment for a few relatively inexpensive items of a large order would amount to only a few dollars; such payment would be withheld until an additional invoice is received. If the minimum payable quantity threshold is met (or if a minimum does not exist) at block 265, related fields are adjusted at block 285 and the portion of the received invoice that applied to the identified quantity is paid at block 295.

If the minimum payable quantity threshold is not met at block 265, but the identified quantity amounts to the total quantity of the order at block 275, the process continues at block 285 as discussed above. This instance is applicable, for example, to implementations where the invoiced quantity is small but the order is small, or when previous invoices amounting to nearly the total quantity have been paid, leaving only a few items unpaid. If the minimum payable quantity threshold is not met at block 265 and the identified quantity does not amount to the total quantity of the order at block 275, payment is held at block 276.

The adjustment of related fields at block 285 is optional and involves one or more of a variety of adjustments. For example, fields such as those relating to extended prices on a particular invoice at the line item level, service charges, taxes and other items may be adjusted. Moreover, items such as service charges and taxes can be processed similarly as shown in FIG. 2B as the "item" at block 245 (e.g., with comparisons to past invoices for determining whether service charges, taxes or other items are appropriate).

Figure 3:
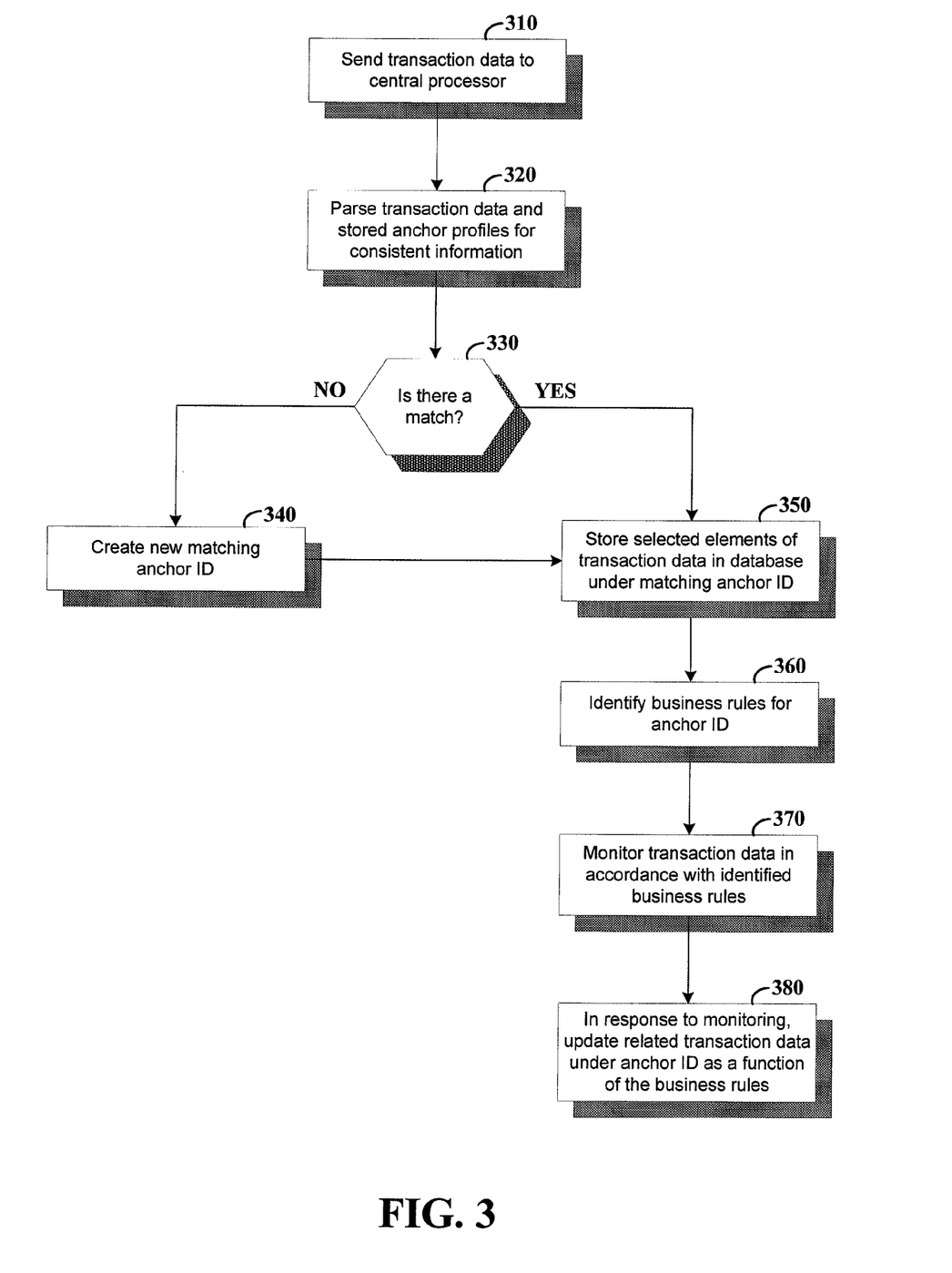
FIG. 3 is another flow diagram, related to the flow diagram shown in FIG. 2A, for an approach to categorizing data as a function of an anchor and monitoring data stored in anchor locations with automatic updating of transaction processing data, according to another example embodiment of the present invention.

FIG. 3 is a flow diagram showing an approach for categorizing data as a function of an anchor and monitoring data stored in locations corresponding to the anchor for automatically updating transaction processing data, according to another example embodiment of the present invention. The flow diagram in FIG. 3 may, for example, be implemented in connection with the flow diagrams shown in FIGS. 2A-2B and discussed above. For instance, the business rules mentioned in connection with FIG. 2A may be implemented in connection with the anchor profiles discussed further below.

At block 310 of FIG. 3, transaction data is sent to a central processor that is programmed for accessing, manipulating and using stored transaction-related data including anchor profile data, as well as for communicating with parties to a transaction or transactions to which the transaction data relates. The stored transaction-related data includes data stored under an anchor identification (ID) that is used to identify a particular transaction for which the transaction-related data is implemented. At block 320, the transaction data is parsed and compared with stored anchor profiles to detect and identify information in the anchor profiles that is consistent with (matches) or otherwise relates to the transaction data. If a match between the transaction data and a stored anchor profile is not found at block 330, a new matching anchor ID is created at block 340 for use in identifying the transaction data sent at block 310 with a particular transaction. If a match between the transaction data and a stored anchor profile is found at block 330 (or, after a new matching anchor ID is created at block 340), selected elements of the transaction data are stored in the database under the matching (or new) anchor ID at block 350. These selected elements may, for example, be used to establish a new anchor profile either alone or in connection with other transaction data (e.g., in the database or received at block 310 at a later time).

Once the transaction data is stored at block 350, business rules for the anchor ID corresponding to the transaction data are identified at block 360. These business rules may, for example, be part of the transaction data received at block 310. In another example, these business rules are pre-stored under a particular user or anchor ID to which the transaction data relates. When the relationship between the transaction data and the user or anchor ID for particular business rules is established, the central processor then uses the particular business rules to monitor and process the transaction data. Specifically, transaction data is monitored in accordance with the identified business rules at block 370 and when a change in transaction data (or new transaction data) is detected, related transaction data under the anchor ID is updated at block 380 in accordance with the business rules. Alternatively, when the change in transaction data applies to data stored under more than one anchor ID (e.g., as discussed below with the scenario with two invoices for a particular order), transaction data under another anchor ID is also updated. In either instance involving a change in transaction data (or, in the instance where the received document is an invoice, involving a proposed change in transaction data, namely, a payable quantity), the approaches discussed in FIGS. 2A-B can be implemented here.

In one particular example embodiment of the present invention, the following data attributes, documents and identifications are implemented by a central processor to group transactions that are common to a particular interaction between buyer and seller parties. This approach may be implemented, for example, in connection with the data storage and user nodes as shown and discussed above in connection with the transaction processing arrangement 100 shown in FIG. 1. The central transaction node 110 manages sets of information about an interaction as programmed by applicable business rules configuration that can be set at any combination of a variety of rules. For example, programmed business rules may be used in connection with sets of information related to the fulfillment status of an order as discussed in connection with Table 1 below.

Referring below to Table 1 and to FIG. 1, transaction attributes are shown for two documents in connection with a transaction between a buyer and seller as processed by the transaction processing arrangement 100, according to another particular example embodiment of the present invention. When a first document received by the central transaction node 110 is Invoice "123" from Seller "S1" naming Order "ABC" from Buyer "B1" as the justification for the billing, the central processor responds by searching and matching the invoice to information stored in the database. Based on the search (e.g., a logical key search or an algorithm-based search), the central transaction node 110 determines whether it has any previous knowledge of an interaction with the unique attributes used for transaction document identification purposes, here being attributes "123," "S1," "ABC" and "B1." If previous knowledge of the transaction to which the invoice applies is found, the central transaction node 110 aligns the attributes from the invoice with known attribute field, such as that from Receipt "R789" and Order "ABC."

Once the invoice has been associated with other documents/information, the central transaction node 110 performs a variety of transaction-related operations, such as those discussed above, using data from the Invoice "123" and other documents and information in the database 112. For example, when a quantity of a product or other transaction-related item ordered for the transaction is identified, the Ordered Not Billed quantity resource "QTY1" at the line item level is increased for the Receipt "R789." The Ordered Not Received quantity resource for Receipt "R789" is also correspondingly updated to match the increase in the Ordered not Billed quantity. Similarly, when the quantity of a product or other transaction-related item ordered for the transaction is identified, the Ordered Not Received quantity resource "QTY2" at the line item level is increased for the Invoice "123." In this discussion and as otherwise applicable to one or more example embodiments herein, the line item level refers generally to line items, within a particular document, that specify information particular to a line item, where several line items are included in a single document.

The cost of a particular quantity for a transaction is added to either the Ordered Not Billed monetary resource "AMT1" at the line item level or the Ordered Not Billed monetary resource "AMT2" at the document level. This approach is useful, for example, when the total price of an order is different than that for a particular invoice or receipt for a portion of the order (i.e., with the document level referencing an entire order amount, rather than merely the amount for a particular invoice).

When goods are received before Invoice "123," the Received Not Billed quantity resource "QTY3" at the line item level is increased. The total quantity of Order "ABC" at the document level may also be increased in the amount that the quantity resource "QTY3" is increased, which may also correspondingly apply to the Ordered Not Billed and Ordered Not Received quantities at the line item level.

When Invoice "123" is received, the amount billed subtracts from the Ordered Not Billed quantity resource "QTY1" at the line item level as well as the Received Not Billed quantity resource "QTY3" at the line item level. In addition, the amount billed subtracts from either the Ordered Not Billed monetary resource "AMT1" at the line item level or the Ordered Not Billed monetary resource "AMT 2" at the document level. Moreover, as additional invoices are received for Order "ABC," the corresponding quantity resources are continually updated to provide accurate information.

With the approaches discussed above in connection with Table 1 below, the effect of backing out a source of resources can be immediately rolled through all the financial documents claiming resources that have not yet been paid. This technological approach has been found useful in effectively automating the document pre-payment reconciliation process for physical and financial fulfillment.

TABLE 1

| ATTRIBUTE | Invoice 123 | Receipt R789 | Order ABC |
| --- | --- | --- | --- |
| AnchorID | "A1" | "A1" | "A1" |
| Named Buyer | "B1" | "B1" | "B1" |
| Named Seller | "S1" | | |
| Named Order | "ABC" | "ABC" | "ABC" |
| Named Invoice | "123" | | |
| Source Document Owner | "S1" | "B1" | "B1" |
| Source Document Owner Type | Seller | Buyer | Buyer |
| Source Document Type | Invoice | Receipt | Order |
| Source Document ID | "123" | "R789" | "ABC" |
| Ordered Not Billed quantity (line item level) | | "QTY1" | "QTY1" |
| Ordered Not Rec'd quantity (line item level) | "QTY2" | | "QTY2" |
| Ordered Not Billed monetary (line item level) | | "AMT1" | "AMT1" |
| Ordered Not Billed monetary (doc. level) | | | "AMT2" |
| Received Not Billed (line item level) | | "QTY3" | "QTY3" |

Figure 4:
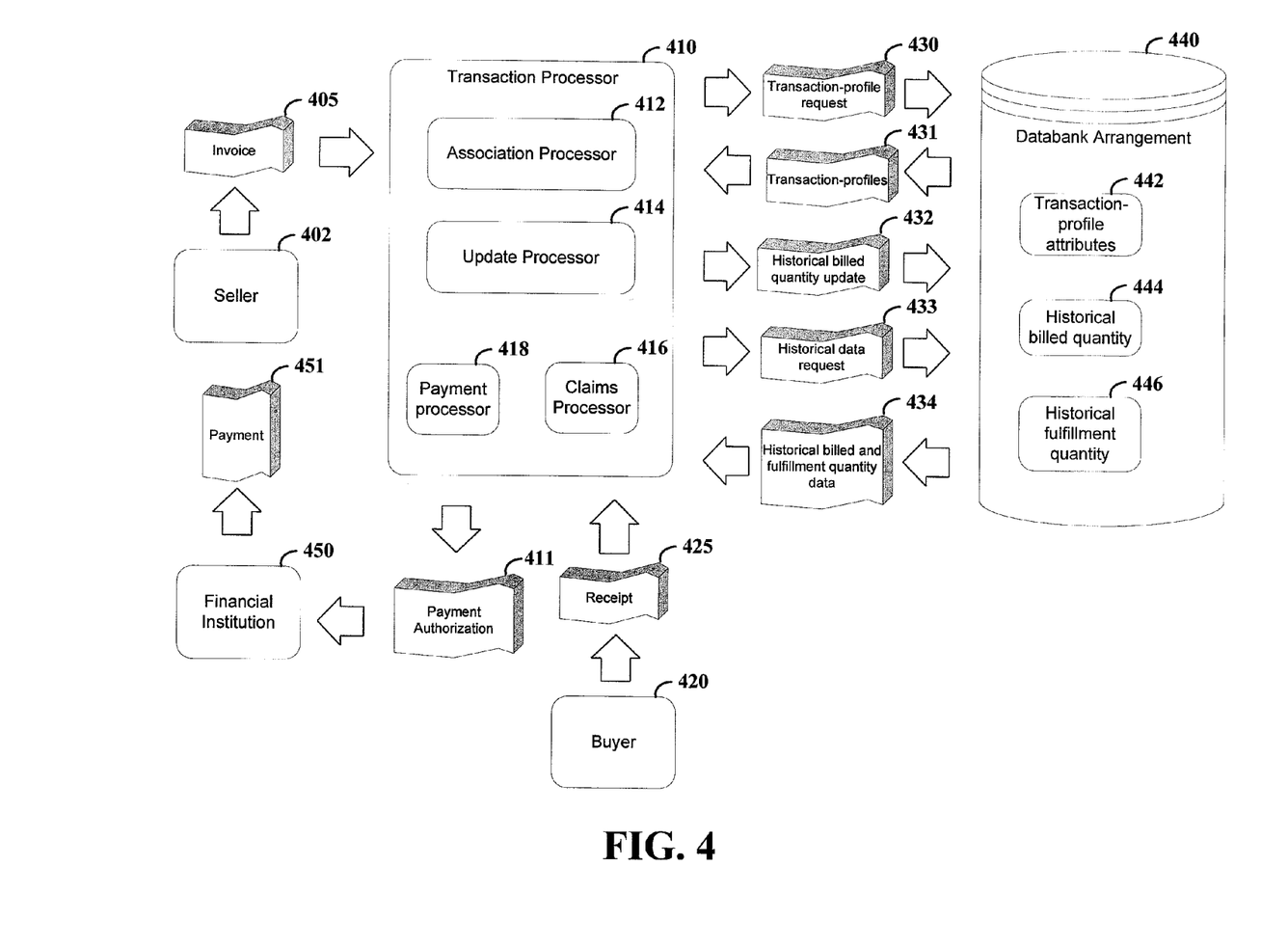
FIG. 4 shows an arrangement for processing claims for a plurality of transactions, according to another example embodiment of the present invention.

FIG. 4 shows an arrangement for processing claims for a plurality of transactions, according to another example embodiment of the present invention. Various ones of the example embodiments and implementations discussed herein are selectively implemented using the arrangement in FIG. 4. An example application of the arrangement in FIG. 4 involving a buyer and a seller is discussed as follows; while described in connection with this example, the arrangement in FIG. 4 is configured for processing similar transactions for a multitude of disparate buyer and seller combinations, using transaction-profile attributes pertaining to transactions involving each buyer and seller combination.

A seller 402 generates an invoice 405 and sends the invoice to a transaction processor 410. In response to receipt of the invoice 405, an association processor 412 associates the invoice with a particular transaction and sends a transaction profile request 430 to a databank arrangement 440, which returns transaction profiles 431 per stored attributes 442. An update processor 414 uses the returned transaction profiles to identify an appropriate historical billed quantity 444 (e.g., a data field) in the databank arrangement 440, which is updated with historical billed quantity update information 432.

When a buyer 420 generates a receipt 425, the association processor 412 associates the receipt with a particular transaction and sends another transaction profile request 430 to the databank arrangement 440, which returns appropriate transaction profiles 431. The update processor 414 uses the transaction-profile attributes and the receipt data to update an appropriate historical fulfillment quantity 446 (e.g., a data field) in the databank arrangement 440.

The transaction processor 410 is adapted to process in accordance with the above-discussed approaches involving the receipt of the invoice data 405 and the receipt data 425 in different orders. Regardless of the order, the claims processor 416 is responsive to the invoice 405 by sending an historical data request 433 to the databank arrangement 440, which returns historical billed and fulfillment quantity data 434. The claims processor 416 uses the returned historical billed and fulfillment quantity data 434 to determine whether payment for some or all of the invoice 405 is appropriate. For instance, when the historical fulfillment quantity exceeds the historical billed (e.g., and paid) quantity by an amount equal to a quantity billed in the invoice 405, the claims processor 416 determines that the entire invoice can be paid.

Once payment is authorized by the claims processor 416, a payment processor 418 uses the authorization to facilitate payment for the invoice 405 by sending a payment authorization 411 to a financial institution 450 identified, e.g., in the returned transaction-profiles 431. The financial institution 450 in turn sends payment 451 to the seller 402.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. A system for managing payment resources for a plurality of transactions, the system comprising:
a computer circuit programmed to:
associate an invoice with a given transaction in the plurality of transactions, the transactions involving merchant offerings among parties including buyers and sellers, different ones of the transactions involving different sets of buyers and sellers;
generate, for each ordered item listed on the invoice, electronic payment authorization data for the ordered item in response to determining at the computer circuit that a billed quantity of the ordered item is less than or equal to a difference between a historical fulfillment quantity for the ordered item and a historical billed quantity for the ordered item, the historical fulfillment quantity for the ordered item and the historical billed quantity for the ordered item indicated in data for the given transaction stored in a database, and
update, in the database, the historical billed quantities for the ordered items listed on the invoice as a function of the billed quantities of the ordered items.

2. The system of claim 1, wherein the computer circuit is programmed to, in response to the billed quantity of the ordered item being more than the difference between the historical fulfillment quantity for the ordered item and the historical billed quantity for the ordered item, identify a quantity of the ordered item that exceeds the difference between the historical fulfillment quantity for the ordered item and the historical billed quantity for the ordered item as over-billed.

3. The system of claim 2, wherein the computer circuit is programmed to generate the electronic payment authorization data for a quantity of the ordered item that does not exceed the difference between the historical fulfillment quantity for the ordered item and the historical billed quantity for the ordered item.

4. The system of claim 3, wherein the computer circuit is programmed to communicate a quantity of an over-billed item on the invoice to a seller involved with the given transaction.

5. The system of claim 1, wherein the computer circuit is programmed to:
receive confirmed fulfillment information, the confirmed fulfillment information confirming fulfillment of a particular item for an order, and
automatically update historical fulfillment quantity data in the database for the particular item to reflect the confirmed fulfillment information.

6. The system of claim 1, wherein the computer circuit is programmed to:
monitor changes made to selected data fields in the database; and
in response to a change in one of the selected data fields, update another related data field.

7. The system of claim 6, wherein the computer circuit is programmed to automatically link related data fields for the given transaction as a function of a transaction party to which the related data fields apply.

8. The system of claim 1, wherein the computer circuit is programmed to:
compare information in the invoice with profile information stored in the database to match the invoice with historical fulfillment quantities for the ordered items and the historical billed quantities for the ordered items, and
use the matched historical fulfillment quantities for the ordered items and the historical billed quantities for the ordered items when generating electronic payment authorization data for each of the ordered items listed on the invoice.

9. The system of claim 1,
wherein the database stores transaction-profile attributes for each of the transactions, and
wherein the computer circuit is programmed to:
identify, based on information in the transaction-profile attributes, order information for the given transaction and at least one of a buyer and a seller, wherein the buyer and the seller are involved with the given transaction, and
generate electronic payment authorization data for each ordered item listed on the invoice as a function of the transaction-profile attributes.

10. The system of claim 9, wherein the computer circuit is programmed to:
monitor changes in a transaction-profile attribute that indicates a fulfillment status of an order, and
in response to changes in the fulfillment status of the order, update other transaction-profile attributes that relate to the fulfillment status for the order.

11. The system of claim 10, wherein the computer circuit is programmed to update payment-related attributes for the order in response to the order being fulfilled.

12. The system of claim 10, wherein the computer circuit is programmed to facilitate payment for the order in response to an update to the payment-related attributes for the order indicating that the payment is appropriate.

13. The system of claim 1, wherein to generate the electronic payment authorization data for the ordered item, the computer circuit compares the billed quantity information for the ordered item with the historical fulfillment quantity for the ordered item and the historical billed quantity for the ordered item.

14. The system of claim 13,
wherein the database stores data characterizing a paid quantity for ordered items of the given transaction, and
wherein the computer circuit is programmed to update, in response to payment being authorized, the data characterizing the paid quantity for the ordered items.

15. The system of claim 1, wherein the computer circuit is programmed to audit and validate the historical fulfillment quantity for the ordered item as a function of receipt data, thereby validating that received quantity resources have been added to the historical fulfillment quantity for the ordered item.

16. The system of claim 1,
wherein the database stores data characterizing historical fulfillment quantities and historical billed quantities for the ordered items on a line item by line item basis, and
wherein the computer circuit is programmed to generate the electronic payment authorization data, and update the historical billed quantities on a line item by line item basis.

17. The system of claim 1, wherein the computer circuit is programmed to update the historical fulfillment data for the ordered item in the database as a function of a time of delivery of the ordered item.

18. The system of claim 1, wherein the computer circuit is programmed to update the historical fulfillment data for the ordered item in the database as a function of a condition of the ordered item upon delivery thereof.

19. A method for automatically managing payment resources for a plurality of transactions, the method comprising:
associating, by a computer-based circuit, an invoice with a particular transaction as a function of data in the invoice and stored transaction-profile information, the invoice listing quantities of ordered items; and
generating, by the computer-based circuit, electronic payment authorization data as a function of historical fulfilled quantities for the ordered items and historical billed quantities for the ordered items,
the historical fulfillment quantities for the ordered items indicating quantities of the ordered items that have been fulfilled by a seller for the transaction,
the historical billed quantities for the ordered items being indicative of quantities of the ordered items that have been previously billed, and
the electronic payment authorization data authorizing a financial institution to facilitate a payment from a buyer involved in the transaction to the seller, the payment is for quantities of the ordered items that do not exceed a difference between the historical fulfillment quantities for the ordered items and the historical billed quantities for the ordered items.

20. The method of claim 19, wherein the ordered items include a given item and generating the electronic payment authorization data includes generating electronic payment authorization data for at least a portion of the historical fulfillment quantity for the given item that does not exceed an order total quantity for the given item.

21. The method of claim 19, wherein the ordered items include a given item and the method further comprises:

in response to generating the electronic payment authorization data, storing data indicating a quantity of the given item for which the payment was authorized.

22. The method of claim 19, wherein the ordered items include a given item and the method further comprises:

in response to receiving receipt data from the buyer, associating the receipt data with the transaction as a function of the transaction-profile information, the receipt data indicating a quantity of the given item, and updating the historical fulfillment quantity for the given item based on the quantity of the given item indicated in the receipt data.

23. A method for managing payment resources for a plurality of transactions, the method comprising:

associating, by a computer circuit, an invoice with a given transaction in a plurality of transactions, the transactions involving merchant offerings among parties including buyers and sellers, different ones of the plurality of transactions involving different sets of buyers and sellers;

generating, for each ordered item listed on the invoice, electronic payment authorization data for the ordered item in response to determining at the computer circuit that a billed quantity of the ordered item is less than or equal to a difference between a historical fulfillment quantity for the ordered item and a historical billed quantity for the ordered item, the historical fulfillment quantity for the ordered item and the historical billed quantity for the ordered item indicated in data for the given transaction stored in a database, and updating, in the database, the historical billed quantities for the ordered items as a function of the billed quantities of the ordered items.

\* \* \* \* \*